United States Patent
Iyer et al.

(10) Patent No.: US 8,605,901 B1
(45) Date of Patent: Dec. 10, 2013

(54) SYSTEM AND METHOD FOR PROVISIONING A HOME AGENT IN A NETWORK ENVIRONMENT

(75) Inventors: Jayaraman R. Iyer, San Jose, CA (US); Kent K. Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 12/509,455

(22) Filed: Jul. 25, 2009

(51) Int. Cl.
*H04L 9/12* (2006.01)
*H04L 7/10* (2006.01)

(52) U.S. Cl.
USPC .......................................... 380/249; 380/270

(58) Field of Classification Search
None
See application file for complete search history.

(56) References Cited

U.S. PATENT DOCUMENTS

| | | | | |
|---|---|---|---|---|
| 7,382,748 | B1 * | 6/2008 | Bharatia et al. | 370/331 |
| 7,590,420 | B1 * | 9/2009 | Zaghloul et al. | 455/435.2 |
| 2006/0002356 | A1 * | 1/2006 | Barany et al. | 370/338 |
| 2006/0203791 | A1 * | 9/2006 | Carrion-Rodrigo et al. | 370/338 |
| 2007/0245007 | A1 * | 10/2007 | Tsirtsis et al. | 709/223 |
| 2009/0061869 | A1 * | 3/2009 | Bui et al. | 455/435.1 |
| 2009/0257400 | A1 * | 10/2009 | Perras | 370/331 |

OTHER PUBLICATIONS

Markus Bauer et. al., Comparison of Different Strategies for UMTS and WLAN Integration, presentation at the IP-based Cellular Networks (IPCN 2002) conference, Paris, France, Apr. 2002, 11 pages.
Alvarion, "The Disruptive Approach of Open WiMAX," White Paper, © 2007, 8 pages.
J. Iyer and A.P. Iyer, "Handling Mobility Across WiFi and WiMAX," 6 pages.

* cited by examiner

*Primary Examiner* — Venkat Perungavoor
(74) *Attorney, Agent, or Firm* — Patent Capital Group

(57) ABSTRACT

A method is provided in one example embodiment and includes communicating an access request to an authentication, authorization, and accounting (AAA) element. The access request is configured to include an attribute that indicates that a network element can support a particular home agent assignment from amongst a plurality of home agents. The method also includes receiving a response that includes an Internet Protocol (IP) address of a home agent loadbalancer, the response including a key that establishes a secure connection between the network element and the home agent loadbalancer. In other embodiments, the method includes communicating with a foreign agent in order to authenticate user equipment associated with the access request. In addition, the access request can be initiated by user equipment configured to establish a network communication session via the particular home agent.

20 Claims, 3 Drawing Sheets

DYNAMIC HOME AGENT ASSIGNMENT CALL FLOW

DYNAMIC HOME AGENT ASSIGNMENT WITHOUT AAA AWARENESS

US 8,605,901 B1

SYSTEM AND METHOD FOR PROVISIONING A HOME AGENT IN A NETWORK ENVIRONMENT

TECHNICAL FIELD

This disclosure relates in general to the field of communications and, more particularly, to provisioning a home agent in a network environment.

BACKGROUND

Networking architectures have grown increasingly complex in communication environments. One such architecture is WiMAX, which is a technology enabling the delivery of last mile wireless broadband access as an alternative to wired broadband (like cable and DSL). WiMAX can provide fixed, nomadic, portable, and mobile wireless broadband connectivity without the need for a direct line-of-sight with a base station. In a typical network deployment, a home agent is in a mobile node's home network and can tunnel datagrams for delivery to the mobile node when the node is away from home. The home agent can maintain current location information for the mobile node, and it is often configured to interface with one or more foreign agents.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating an access request to an authentication, authorization, and accounting (AAA) element. The access request is configured to include an attribute that indicates that a network element can support a particular home agent assignment from amongst a plurality of home agents. The method also includes receiving a response that includes an Internet Protocol (IP) address of a home agent loadbalancer, the response including a key that establishes a secure connection between the network element and the home agent loadbalancer. In other embodiments, the method includes communicating with a foreign agent in order to authenticate user equipment associated with the access request. The access request can be communicated using a RADIUS communications protocol.

Example Embodiments

Figure 1:
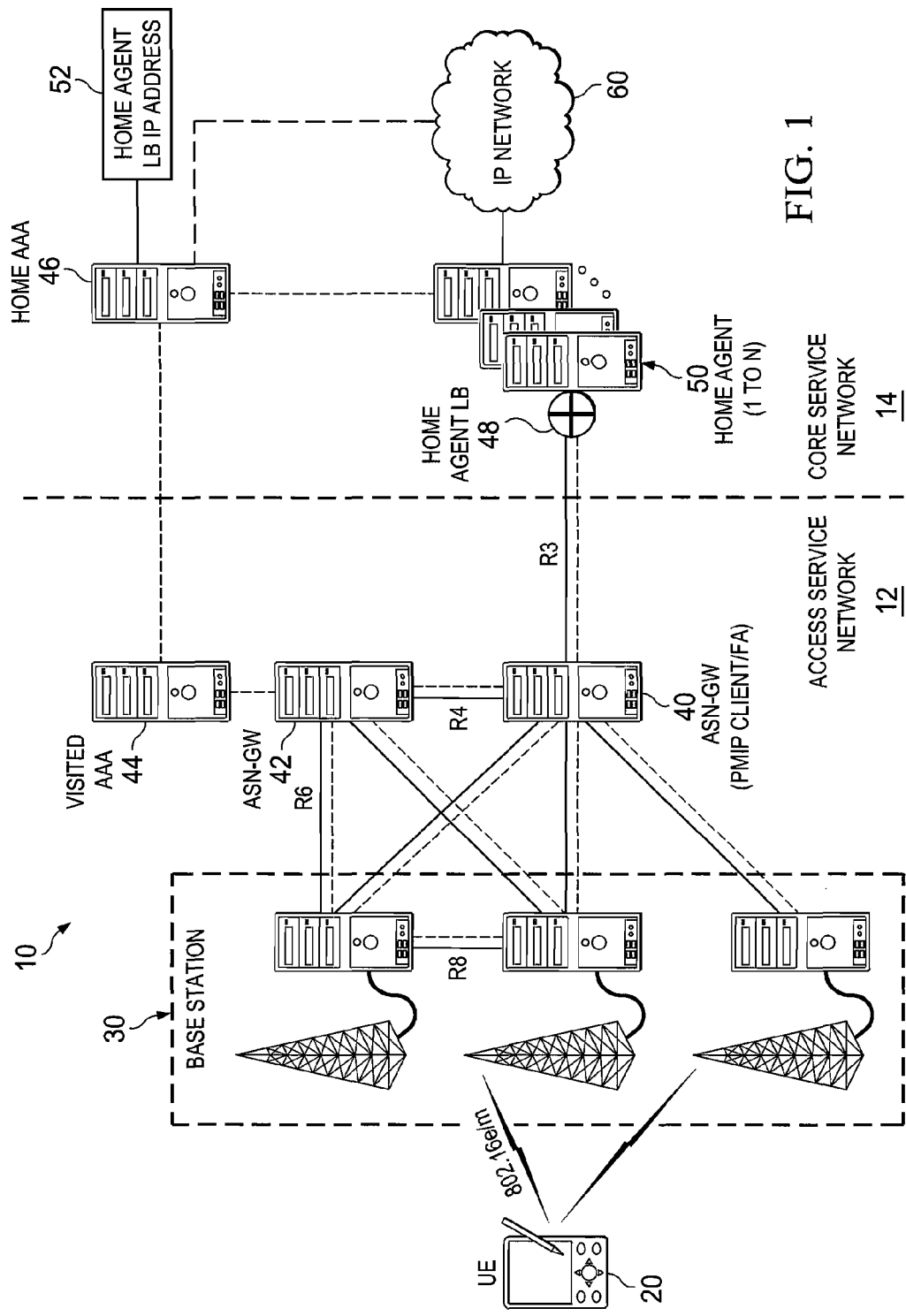
FIG. 1 is a simplified block diagram of a communication system for provisioning home agents in a network environment in accordance with one embodiment of the present disclosure.

Turning to FIG. 1, FIG. 1 is a simplified block diagram of a communication system 10 for provisioning one or more home agents in a network environment. FIG. 1 may include an access service network (ASN) 12, a core service network 14, user equipment (UE) 20, a set of base stations 30, several ASN gateways (ASN-GWs) 40 and 42, a visited authentication, authorization, and accounting (AAA) element 44, and a home AAA element 46. FIG. 1 may also include a home agent loadbalancer (LB) 48 that can interface with multiple home agents (1-*n*) 50. A single home agent load balancer Internet Protocol (IP) address (HA LB IP address) 52 is also provided in core service network 14. Home agents 50 can be part of a home agent cluster, which can be coupled to an IP network 60.

Communication system 10 may include multiple instances of UE 20, which can be coupled to multiple base stations 30 through a suitable interface (e.g., an R1 interface in a WiMAX implementation). In one example, each base station (BS) may be coupled to a respective access service network gateway/foreign agent [ASN-GW/FA], which is depicted as a proxy mobile IP (PMIP) client in FIG. 1. The interaction between base stations 30 and ASN-GWs 40 and 42 may occur through a series of interfaces (e.g., the R6 interface). Another interface (e.g., the R8 interface) may be used by the base stations to communicate with each other.

In one example embodiment, the R1 interface is the radio wireless interface between a WiMAX terminal and the base station. Its protocol could be defined by IEEE 802.16d/e, which has defined quality of service (QoS) policy parameters. The R6 interface standard is provided by the WiMAX Forum Network Working Group (NWG). The R4 interface accommodates mobility between two ASN-GWs. The R3 interface is provided between access service networks and connectivity service networks (CSNs).

For purposes of illustrating some example techniques of communication system 10, it is important to understand the communications that may be traversing the network and which provide routing information to any given network element. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a WiMAX network, there is no Proxy Mobile IP (PMIP) solution for dynamic home agent assignment. In the context of proxy mobile IP, a PMIP client normally communicates with a home agent and a core service network. A specific home agent address is delivered to the PMIP client such that a pairwise security association exists between the PMIP client and the home agent, as well as between the foreign agent and the home agent. Subsequent data exchanges are sent along this foreign agent/home agent connection. One problem arises with certain connections when load balancing occurs in the network. The original security associations delivered to the PMIP client may no longer be valid because of a potential change in the home agent. If a home agent were dynamically assigned based on Home Agent loadbalancing, the initial security associations would be lost, and additional processing would have to be performed in order to reestablish the associations corresponding to the new Home Agent.

Communication system 10, in example embodiments, can provision a cluster of home agents for secure communications with the foreign agent. Home AAA element 46 is provisioned with HA LB IP address 52 and this is the address that is delivered to a foreign agent (e.g., a foreign agent provisioned in conjunction with ASN-GW 40). Currently, the home agent is assigned by the AAA server and the mobility session is stuck with this specific HA IP address when PMIP signaling is used. Example embodiments of the outlined architecture can allow a home agent to be dynamically assigned in the WiMAX PMIP signaling. This could allow the WiMAX PMIP signaling to support dynamic assignment of home agents in the registration procedure. This could be accomplished, in example implementations, by the following operations. First, the system can introduce existing WiMAX RADIUS attributes in the Access-Request and Access-Accept messages (in the exchange between the ASN-GW and the home AAA element) to provide the keys needed by the ASN-GW to generate a registration request with the proper authentication credentials. This method could provide backward compatibility for the ASN-GW, which does not support this feature. Second, the system could enhance the ASN-GW to establish the proper security association for the mobility session when the registration reply is received, and the message contains the assigned home agent.

Before turning to some of the operations of this architecture, a brief discussion is provided about some of the infrastructure of FIG. 1. UE 20 can be associated with clients or customers wishing to initiate a communication in communication system 10 via some network. The term 'user equipment' is inclusive of devices used to initiate a communication, such as a computer, a personal digital assistant (PDA), a laptop or electronic notebook, a cellular telephone, an I-phone, an IP phone, or any other device, component, element, or object capable of initiating voice, audio, video, or data exchanges within communication system 10. UE 20 may also be inclusive of a suitable interface to the human user, such as a microphone, a display, or a keyboard or other terminal equipment. UE 20 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another.

ASN-GWs 40 and 42 and home agent loadbalancer (LB) 48 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, servers, processors, modules, or any other suitable device, component, element, or object operable to exchange information in a network environment. The network elements may include a foreign agent or, alternatively, the network elements may simply be configured to interact with a foreign agent and this architecture may depend on whether mobile IP is supported. Thus, the network elements and the foreign agents may be provided separately as their own independent elements. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, the network elements (e.g., ASN-GWs 40, 42 and home agent LB 48) include software to achieve the home agent provisioning operations, as outlined herein in this document. In other embodiments, this feature may be provided external to the network elements or included in some other network device to achieve this intended functionality. Alternatively, both the network elements include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Home AAA element 46 and visited AAA element 44 are server programs that handle requests [from other network elements on behalf of user equipment] for access to networking resources. Networking resources refers to any device, component, or element that provides some functionality to endpoints communicating in communication system 10. For a corresponding network, AAA elements [i.e., visited AAA element 44 and home AAA element 46] may also provide authentication, authorization, and accounting services and management. Authorization generally refers to the process of giving endpoints permission to do or to access something. In multi-user computer systems, a system administrator may define for the system which end users are allowed access to particular data in the system and, further, what privileges are provided for endpoints. Once an end user has logged into a network, the network may wish to identify what resources the end user is given during the communication session. Thus, authorization within communication system 10 may be seen as both a preliminary setting up of permissions by a system administrator and the actual checking or verification of the permission values that have been set up when the end user is attempting access. Authentication generally refers to the process of determining whether the end user is in fact who or what it is declared to be.

AAA elements typically interact with network access and gateway servers, and with databases and directories containing user information. One standard by which devices or applications communicate with an AAA element is through a Remote Authentication Dial-In User Service (RADIUS) protocol, while other standards that could be employed include the Terminal Access Controller Access Control System (TACACS) or DIAMETER protocols.

AAA elements may receive the IP address and other parameters from any suitable source, such as a dynamic host configuration protocol (DHCP) server or a domain name system (DNS) database element, in order to direct data to be communicated to an end user. The AAA element may include any suitable hardware, software, component, or element that operates to receive data associated with an end user and provides corresponding AAA related functions to network components within communication system 10. In operation, home AAA element 46 can be configured with one home agent IP address (e.g., the IP address associated with home agent loadbalancer 48) for dynamic home agent assignment, independent of the number of home agents and unaffected by changes when home agents are added or removed. Authorization and IP address management may also be retrieved by the AAA element from a layer two tunneling protocol network server (LNS), which may be provided to address secure services for the end user where appropriate. The assigned IP address may be a private VPN or a public IP address. On assignment of the IP address, the DHCP server may perform update procedures for updating the assigned IP address and leasing parameters for the end user.

Home agents 50 can have their responsibilities load balanced by home agent loadbalancer 48. Home agent loadbalancer 48 can monitor the load on each of the home agents and distribute the sessions among them for optimal signaling and throughput performance. More home agents may be added to serve home agent loadbalancer 48 as the number of subscribers increase. Home agents 50 can cooperate with DHCP servers during IP registration in order to assign an IP address to end users. On authentication, an end user may be assigned an IP address by the home agent. The DHCP server may subsequently update the DNS database before returning the IP address and other provisioned parameters to an end user. An IP tunnel may be established between the network and the home agent to enable secure end-to-end packet transport.

The foreign agents (FA) [potentially included within aforementioned ASN-GWs 40 and 42] are routing elements that could also be included within a network access server (NAS) in a network that allows a node to utilize a home network address. The foreign agent can tunnel datagrams to, and detunnel datagrams from, the home agent for the given home network.

ASN-GW 40 can provide access gateway functions between the 802.16e wireless domain and the IP network. In example embodiments, it can be the first hop IP router from the user's perspective and, further, provide NAS and accounting client capabilities for interaction with AAA servers. ASN-GW 40 can support access network authentication and security functions. ASN-GW 40 can also provide local mobility anchor capability so that users can move between base-stations. ASN-GW 40 also caches authentication and security information to accommodate fast roaming of users across base-stations or between ASN-GWs 40 and 42. ASN-GW 40 can provide the termination of the mobility function across base-stations and the foreign agent function. ASN-GW 40 can also map the radio bearer to the IP network. Additionally, it acts as an IP gateway for the IP host function that is located on the base station. In certain examples, ASN-GW 40 can offer IP functions performed for the access network including end-to-end Quality of Service, Mobility, and Security.

Figure 2:
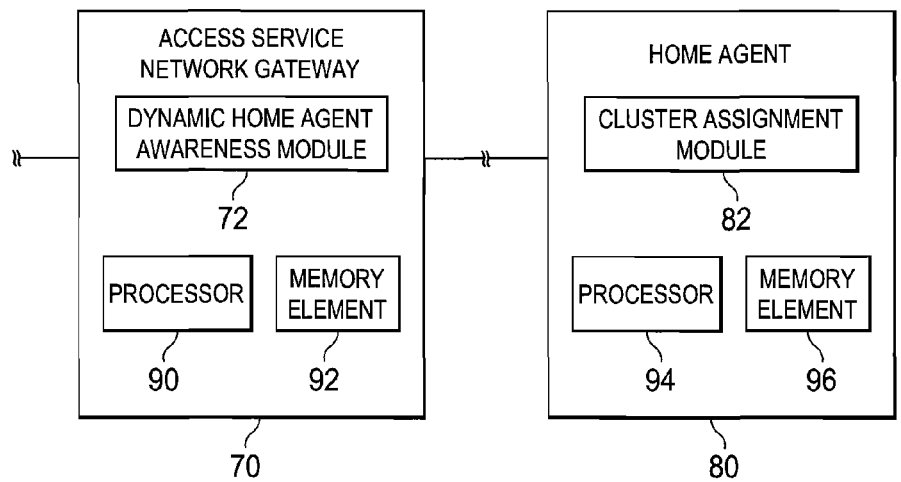
FIG. 2 is a simplified block diagram illustrating potential components of the communication system in one example implementation.

FIG. 2 is a simplified block diagram that illustrates several components of an example architecture for dynamically allocating home agents. FIG. 2 includes an access service network gateway (ASN-GW) 70, which includes a dynamic home agent awareness module 72, a processor 90, and a memory element 92. ASN-GW 70 can interact with a home agent 80, which could be a home agent loadbalancer in certain embodiments, or be a more generic home agent configuration. Home agent 80 may include a cluster assignment module 82, a processor 94, and a memory element 96. These two modules can coordinate communications involving the assignment of home agents. For example, home agent 80 can coordinate communications being sent from the access network such that an AAA element receives a consistent IP address.

Home agent 80 can determine if a received communication is a dynamic home agent assignment exchange such that communications can be mocked (or otherwise transformed), allowing for the AAA element to receive communications that are consistent with what is expected. The AAA element binds the generated keys (detailed below) to the home agent IP address and this can be consistent from the perspective of the AAA element. For example, an access request can be sent from an access service network gateway to an AAA element. Included in the request is an attribute indicating that the access service network gateway can support dynamic home agent assignment for PMIP. Dynamic home agent awareness module 72 can assist in providing this attribute and, further, identify that more than one home agent in a network can serve the access service network gateway. The access service gateway is effectively requesting a selected home agent within the cluster for purposes of provided a secure connection. The virtual address (i.e., the HA LB IP address) can be sent back to the gateway (as detailed below) and this IP address can represent the front-end address of the cluster.

In certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Each of the network elements (e.g., ASN-GW 42, 70, home agent 80, and home agent LB 48) can include memory elements for storing information to be used in achieving the provisioning operations as outlined herein. Additionally, each of these devices may include a processor that can execute software or an algorithm to perform the provisioning activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Figure 3:
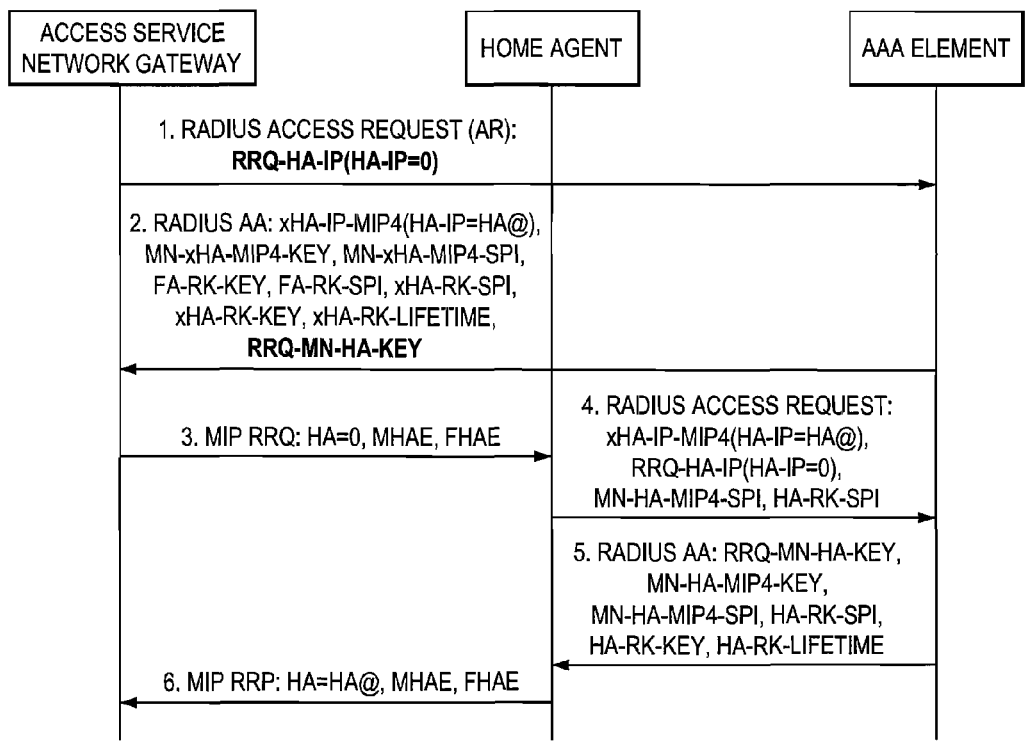
FIG. 3 is a simplified flow diagram illustrating a series of example steps associated with the communication system.

FIG. 3 is a simplified flowchart illustrating an example flow associated with dynamic home agent assignment. At step 1, a RADIUS access [or authentication] request (AR) [RRQ-HA-IP (HA-IP=0)] is sent from an access service network gateway to an AAA element. Within this access request, the registration request (RRQ) HA IP attribute indicates that the ASN-GW supports dynamic home agent assignment for PMIP. In one sense, the ASN-GW is asking for any home agent within the cluster to be used for a secure connection. At step 2, the response from the AAA element is sent back to the ASN-GW and this includes the virtual address (i.e., the HA LB IP address), which happens to be the front-end address of the cluster. More specifically, the RADIUS access accept (AA) could be provided as: xHA-IP-MIP4 (HA-IP=HA@), mobile node MN-xHA-MIP4-KEY, MN-xHA-MIP4-SPI, FA-RK-KEY, FA-RK-SPI, xHA-RK-SPI, xHA-RK-KEY, xHA-RK-Lifetime, RRQ-MN-HA-KEY [where 'root key' is abbreviated (RK)]. In this example, a security key is allocated for this flow involving foreign agents and home agents. The AAA element can derive the MN-HA-PMIP4 key (based on a given HA@) and RRQ-MN-HA-KEY (based on HA=0). The AAA element can then send the attributes to the ASN-GW. The MN-HA key offers security for communications sent from the client into the cluster. Thus, this key is establishing a security association with the cluster. Additionally, this key is providing an association to the HA LB IP address.

Thus, the AAA element can respond with this home agent load balancer IP address, but still secure the communication via the key. At step 3, the ASN-GW obtains the FA-HA key from an authenticator element, which derived the key using HA@ and HA-RK. The MN-HA key (i.e., a RRQ-MN-HA-KEY) and FA-HA key are used for mobile and home agent authentication extensions (MHAE) and foreign and home agent authentication extension (FHAEs) in the initial RRQ. In this example, the signaling is provided as: MIP RRQ: HA=0, MHAE, FHAE.

At step 4, there are transformations being performed in order to validate the communications between the home agent and the AAA element. The home agent and the AAA element can use the same dynamic home agent assignment mechanism used for client mobile IP (CMIP) (i.e., RRQ-HA-IP attribute contains HA=0; MN-HA-MIP4-SPI and HA-RK-SPI conveys the SPI values in MN-HA and FA-HA authentication extensions, respectively). The home agent uses the HA@ in the xHA-IP-MIP4 attribute. Specifically, in this example the signaling is provided as: RADIUS AR: xHA-IP-MIP4 (HA-IP=HA@), RRQ-HA-IP (HA-IP=0), MN-HA-MIP4-SPI, HA-RK-SPI.

At step 5, the AAA element delivers the MN-HA-MIP4-KEY (based on HA@) and RRQ-MN-HA-KEY (based on HA=0) to the home agent. It is assumed that the xHA-IP-MIP4 and MN-HA-MIP4-SPI are used to index the MN-HA-MIP4-KEY. The home agent derives the FA-HA key using HA@ and HA-RK. The home agent authenticates the MN-HA and FA-HA authentication extensions. The MN-HA security association for the mobile subscriber is set to MN-HA-MIP4-KEY. Specifically, the signaling is provided as: RADIUS AA: RRQ-MN-HA-KEY, MN-HA-MIP4-KEY, MN-HA-MIP4-SPI, HA-RK-SPI, HA-RK-KEY, HA-RK-Lifetime.

At step 6, the FA-HA key (obtained in step 2) and MN-HA key (i.e. MN-xHA-MIP4-KEY) are used to authenticate FHAE and MHAE in the registration response (RRP), respectively. After successful authentication of an RRP that is received in response to an RRQ with HA field set to zero, the following can occur. First, the ASN-GW maintains the FA-HA security association (with FA-HA key used for FA-HA authentication) indexed by the HA field in the RRP. Second, the ASN-GW maintains the MN-HA security association (with MN-HA key used for MN-HA authentication) indexed by the HA field in the RRP. Note that this can be different than the CMIP dynamic home agent case, where the mobile node derives a new MN-HA key based on the assigned HA address in the registration reply. Specifically, the signaling is provided as: MIP RRP: HA=HA@, MHAE, FHAE.

In regards to the specific key calculation, this can be based on a MN-HA-PMIP4 formula. In one example computation, the AAA server derives the MN-HA-PMIP4 key (e.g., using HA-IPv4=HA@) to be included in the MN-hHA-MIP4-Key (26/10) or MN-vHA-MIP4-Key (26/66). This key can be used to authenticate the MN-HA authentication extension in RRQ/RRPs. If RRQ-HA-IP VSA was received, the AAA server derives the additional RRQ-MN-HA-PMIP4 key (using HA-IPv4=value in RRQ-HA-IP VSA) to be included in the RRQ-MN-HA-Key (26/19) VSA. This key can be used to authenticate the MN-HA authentication extension in the initial RRQ only. Based on the FA-HA formula and, if required, the authenticator and the AAA server can derive the FA-HA key (using assigned HA) to pass to the FA and HA, respectively. This key is used to authenticate the FA-HA authentication extension in the RRQ/RRPs.

Figure 4:
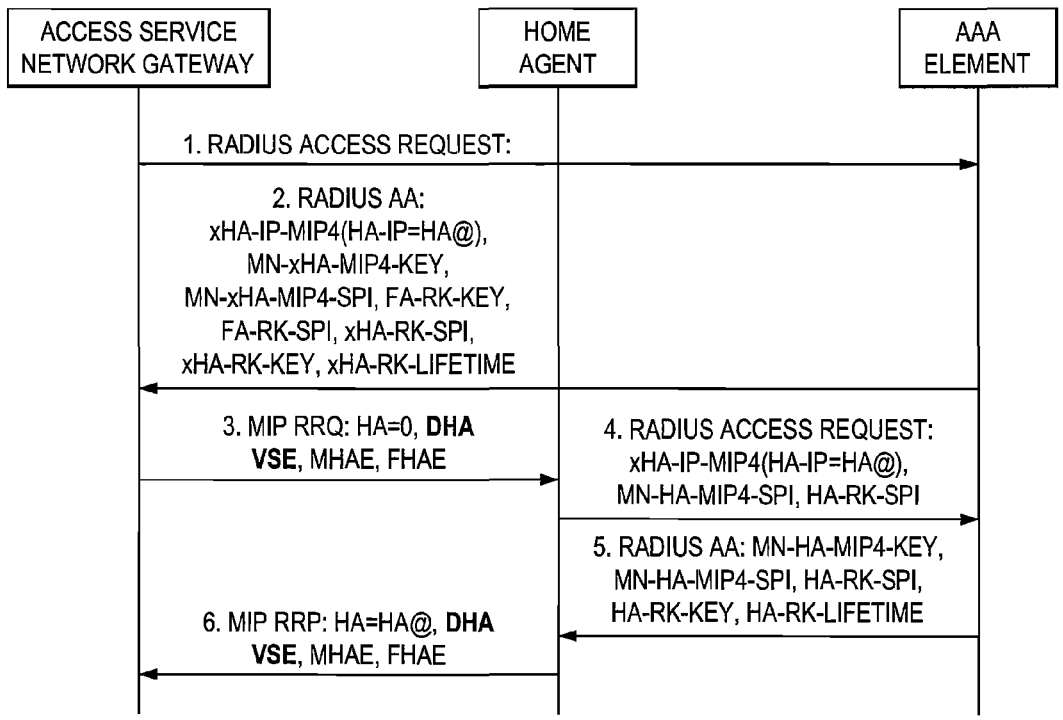
FIG. 4 is a simplified flow diagram illustrating a series of example steps associated with another embodiment of the communication system.

FIG. 4 is a simplified flowchart illustrating an example flow associated with dynamic home agent assignment without AAA awareness. The method can begin at step one, where an access request is sent to the AAA element. This could be in the form of a simple RADIUS message. At step 2, the AAA element responds with a message sent to the ASN-GW. The AAA element can derive the MN-HA-PMIP4 key (based on a given HA@) and send the attributes to the ASN-GW. Specifically, in this instance, the signaling can include: RADIUS AA: xHA-IP-MIP4 (HA-IP=HA@), MN-xHA-MIP4-KEY, MN-xHA-MIP4-SPI, FA-RK-KEY, FA-RK-SPI, xHA-RK-SPI, xHA-RK-KEY, xHA-RK-Lifetime.

At step 3, the ASN-GW obtains the FA-HA key from an authenticator, which derived the key using HA@ and HA-RK. The MN-HA key (i.e., MN-xHA-MIP4-KEY) and FA-HA key can be used for MHAE and FHAE in the initial RRQ. Specifically, in this instance, the signaling can include: MIP RRQ: HA=0, DHA VSE, MHAE, FHAE.

At step 4, the home agent and the AAA element can use a RADIUS exchange mechanism used for CMIP (i.e., MN-HA-MIP4-SPI and HA-RK-SPI conveys the SPI values in MN-HA and FA-HA authentication extensions, respectively). The home agent can use the HA@ in the xHA-IP-MIP4 attribute. Specifically, in this instance, the signaling can include: RADIUS AR: xHA-IP-MIP4 (HA-IP=HA@), MN-HA-MIP4-SPI, HA-RK-SPI. At step 5, the AAA element delivers the MN-HA-MIP4-KEY (based on HA@) to the home agent. It is assumed that the xHA-IP-MIP4 and MN-HA-MIP4-SPI are used to index the MN-HA-MIP4-KEY. The home agent derives the FA-HA key using HA@ and HA-RK. The home agent authenticates the MN-HA and FA-HA authentication extensions. The MN-HA security association for the mobile subscriber is set to MN-HA-MIP4-KEY. Example signaling could include: RADIUS AA: MN-HA-MIP4-KEY, MN-HA-MIP4-SPI, HA-RK-SPI, HA-RK-KEY, HA-RK-Lifetime.

At step 6, the FA-HA key (obtained in step 2) and MN-HA key (i.e. MN-xHA-MIP4-KEY) are used to authenticate FHAE and MHAE in the RRP, respectively. After successful authentication of an RRP that is received in response to an RRQ with HA field set to zero, a number of subsequent operations can be performed. First, the ASN-GW maintains the FA-HA security association (with FA-HA key used for FA-HA authentication) indexed by the HA field in the RRP. Second, the ASN-GW maintains the MN-HA security association (with MN-HA key used for MN-HA authentication) indexed by the HA field in the RRP. Note that this is different from the CMIP dynamic home agent case, the mobile node derives a new MN-HA key based on the assigned HA address in the registration reply. The specific signaling in this example may include: MIP RRP: HA=HA@, DHA VSE, MHAE, FHAE.

In terms of advantages, such an architecture simplifies provisioning. Home AAA element 46 can be configured with one HA IP address (e.g., HA LB IP address) for dynamic home agent assignment, independent of the number of home agents and unaffected by changes when home agents are added or removed. In addition, balanced performance is achieved, as the home agent loadbalancer monitors the load on each of the home agents and distributes the sessions among them for optimal signaling and throughput performance. In addition, modularized scaling can occur because more home agents may be added to serve the HA LB as the number of subscribers increase.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIGS. 3 and 4 illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain AAA, registration, and protocols, communication system 10 may be applicable to other exchanges, routing protocols, or routed protocols in which packets (not necessarily the routing protocol/packets described) are exchanged in order to provide AAA information, QoS parameters, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    communicating by a network element an access request to an authentication, authorization, and accounting (AAA) element, wherein the access request is configured to include an attribute that indicates that the network element can support a particular home agent assignment from amongst a plurality of home agents; and
    receiving by the network element a response that includes an Internet Protocol (IP) address of a home agent loadbalancer, the response including a key that is used to establish a secure and authenticated connection between the network element and the home agent loadbalancer.

2. The method of claim 1, wherein the access request is initiated by user equipment configured to establish a network communication session via the particular home agent.

3. The method of claim 1, further comprising:
    communicating with a foreign agent in order to authenticate user equipment associated with the access request.

4. The method of claim 1, further comprising:
    communicating with a visited AAA element in response to an end user associated with the access request roaming from a home network to a visited network.

5. The method of claim 1, wherein the access request is communicated using a RADIUS communications protocol.

6. The method of claim 1, further comprising:
    directing subsequent packets of a communication session established via the access request to the home agent loadbalancer.

7. Logic encoded in one or more non-transitory tangible media that includes code for execution and when executed by a processor operable to perform operations comprising:
    communicating an access request to an authentication, authorization, and accounting (AAA) element, wherein the access request is configured to include an attribute that indicates that a network element can support a particular home agent assignment from amongst a plurality of home agents; and
    receiving by the network element a response that includes an Internet Protocol (IP) address of a home agent loadbalancer, the response including a key that is used to establish a secure and authenticated connection between the network element and the home agent loadbalancer.

8. The logic of claim 7, wherein the access request is initiated by user equipment configured to establish a network communication session via the particular home agent.

9. The logic of claim 7, further comprising:
    communicating with a foreign agent in order to authenticate user equipment associated with the access request.

10. The logic of claim 7, further comprising:
    communicating with a visited AAA element in response to an end user associated with the access request roaming from a home network to a visited network.

11. The logic of claim 7, wherein the access request is communicated using a RADIUS communications protocol.

12. The logic of claim 7, further comprising:
    directing subsequent packets of a communication session established via the access request to the home agent loadbalancer.

13. An apparatus, comprising:
    a memory element configured to store data,
    a processor operable to execute instructions associated with the data, and
    an awareness module configured to identify that more than one home agent in a network can interface with a network element, the awareness module being further configured to:

communicate an access request to an authentication, authorization, and accounting (AAA) element, the access request operable to include an attribute that indicates that the network element can support a particular home agent assignment from amongst a plurality of home agents, and receive a response that includes an Internet Protocol (IP) address of a home agent loadbalancer, the response including a key that is used to establish a secure and authenticated connection between the network element and the home agent loadbalancer.

14. The apparatus of claim 13, wherein the network element is further operable to communicate with a foreign agent in order to authenticate user equipment associated with the access request.

15. The apparatus of claim 13, wherein the network element is further operable to communicate with a visited AAA element in response to an end user associated with the access request roaming from a home network to a visited network.

16. The apparatus of claim 13, wherein the access request is communicated using a RADIUS communications protocol.

17. The apparatus of claim 13, wherein the access request is initiated by user equipment configured to establish a network communication session via the particular home agent.

18. The apparatus of claim 13, wherein the access request is communicated using a DIAMETER communications protocol.

19. The apparatus of claim 13, wherein subsequent packets of a communication session established via the access request are directed to the home agent loadbalancer.

20. The apparatus of claim 13, wherein the home agent loadbalancer includes a cluster assignment module configured to execute a particular home agent assignment and configured to track flows associated with the particular home agent assignment.

* * * * *